United States Patent
Hartman et al.

(10) Patent No.: US 8,472,178 B2
(45) Date of Patent: Jun. 25, 2013

(54) MEMORY RETENTION SYSTEM TO REDUCE SHOCK-RELATED DISCONTINUITIES

(75) Inventors: Corey D. Hartman, Hutto, TX (US); Brian T. Whitman, University Place, WA (US); Peter Heinrich, Milton, WA (US); Russell Smith, Taylor, TX (US); Scott Munroe Deane, La Center, WA (US); Timothy Spencer, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 300 days.

(21) Appl. No.: 12/908,995

(22) Filed: Oct. 21, 2010

(65) Prior Publication Data

US 2012/0099268 A1    Apr. 26, 2012

(51) Int. Cl.
*H05K 7/04* (2006.01)
(52) U.S. Cl.
USPC ............ 361/679.31; 361/679.32; 361/679.01; 361/679.02
(58) Field of Classification Search
USPC ............ 361/729, 731, 733, 732, 728, 679.01, 361/679.02, 679.31, 679.32
See application file for complete search history.

(56) References Cited

U.S. PATENT DOCUMENTS

| | | | | |
|---|---|---|---|---|
| 4,124,878 A | * | 11/1978 | Ebner et al. | 361/802 |
| 5,334,038 A | * | 8/1994 | Davidge et al. | 439/267 |
| 5,734,551 A | * | 3/1998 | Hileman et al. | 361/695 |
| 5,954,122 A | * | 9/1999 | Sittig | 165/80.2 |
| 6,353,541 B1 | * | 3/2002 | Leman et al. | 361/809 |
| 7,453,707 B2 | * | 11/2008 | Beall et al. | 361/796 |
| 7,635,267 B2 | * | 12/2009 | Farrow et al. | 439/61 |
| 7,787,258 B2 | * | 8/2010 | Cheney et al. | 361/801 |
| 7,835,155 B2 | * | 11/2010 | Gelfond et al. | 361/759 |
| 8,248,777 B2 | * | 8/2012 | Prest | 361/679.36 |
| 2012/0020004 A1 | * | 1/2012 | Rau et al. | 361/679.31 |

OTHER PUBLICATIONS

Alejandro Z. Rodriguez, Brian T. Whitman, Char Damneun, Corey D. Hartman, Glen P. Gordon and Jeffory L. Smalley; "Fan Mounting System;" Filed on Jul. 29, 2010; U.S. Appl. No. 12/846,826; 33 Pages.

* cited by examiner

*Primary Examiner* — Boris L. Chervinsky
*Assistant Examiner* — Pete Lee
(74) *Attorney, Agent, or Firm* — Haynes and Boone, LLP

(57) ABSTRACT

A memory retention and support system includes a memory chassis. A board is mounted to the memory chassis. A memory connector is mounted to the board and includes a pair of guide members at opposite distal ends of the memory connector and a pair of opposing outer walls extending between the guide members. A connector reinforcing member engages the memory connector to urge the guide members toward each other and to urge the opposing outer walls toward each other. A damping member is operable to be positioned adjacent to and spaced apart from the memory connector in order to engage a memory module when the memory module is coupled to the memory connector. The connector reinforcing member and the damping member act to resist a discontinuities between a plurality of memory contacts on the memory module and a plurality of connector contacts on the memory connector.

20 Claims, 18 Drawing Sheets

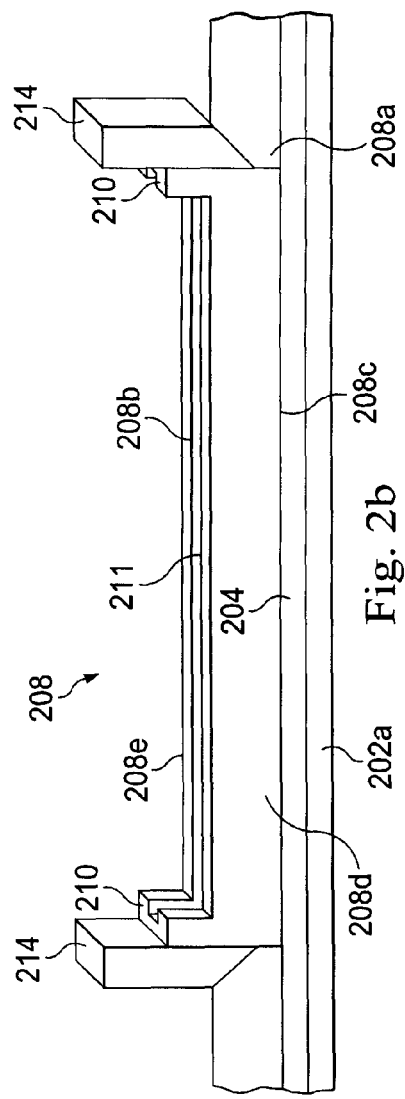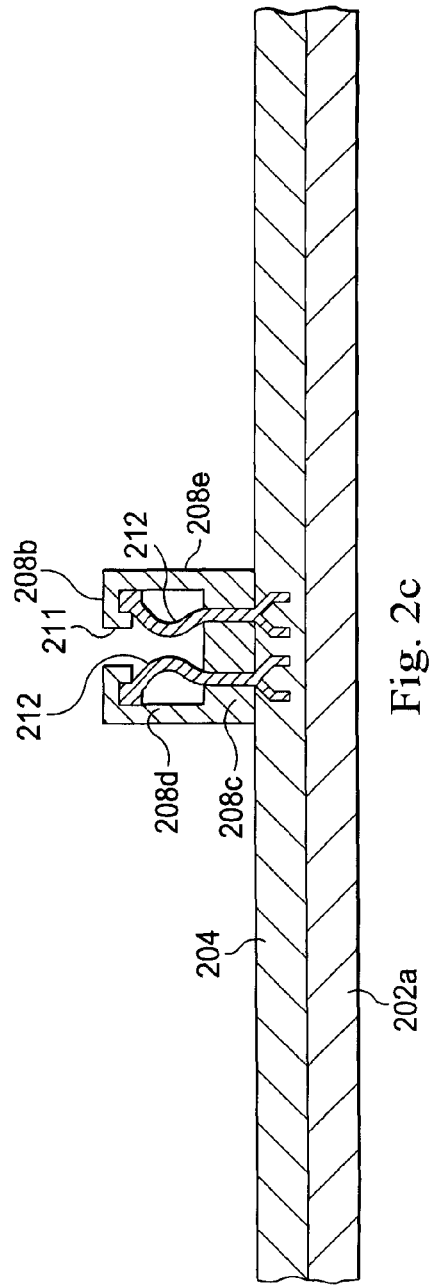

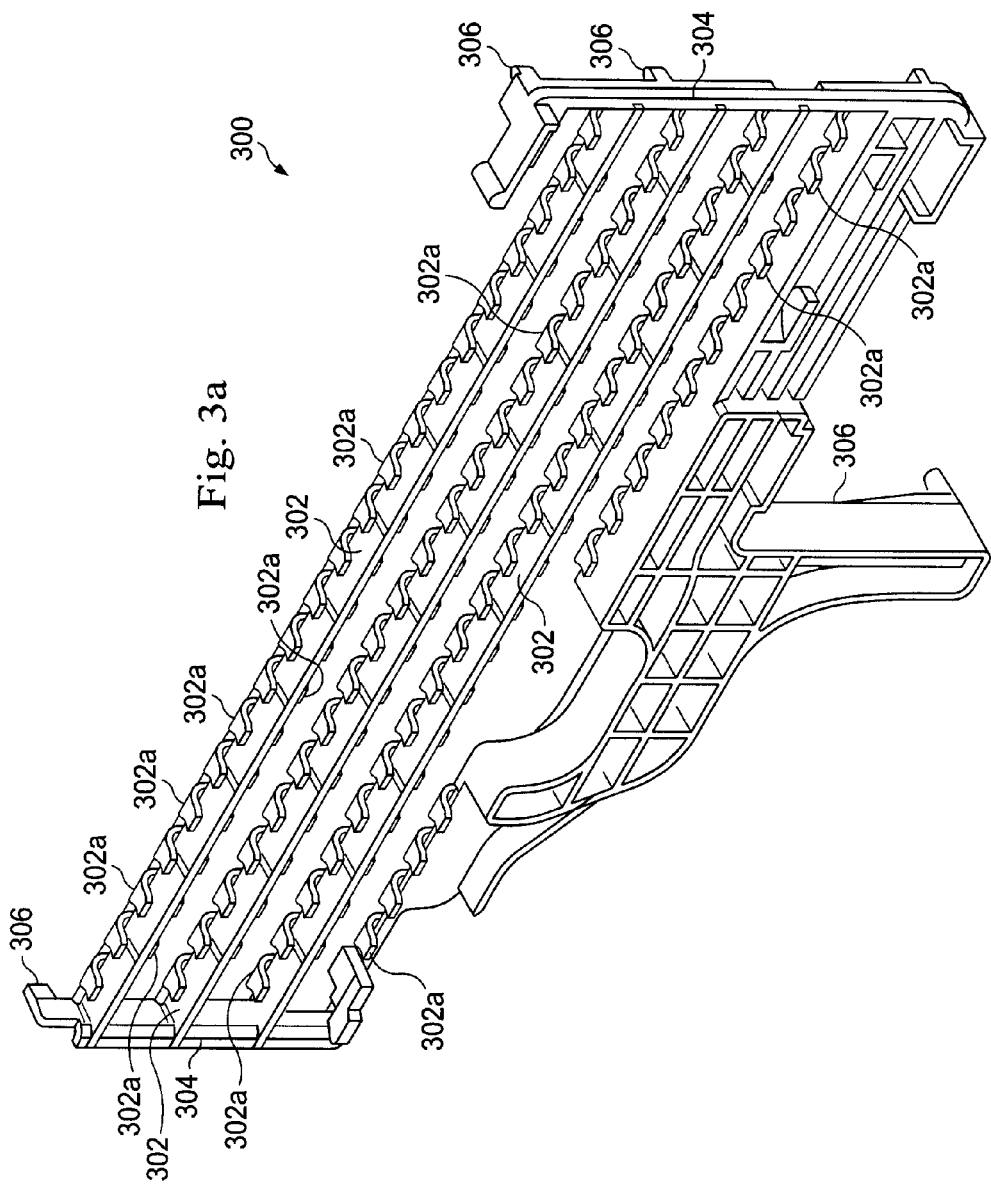

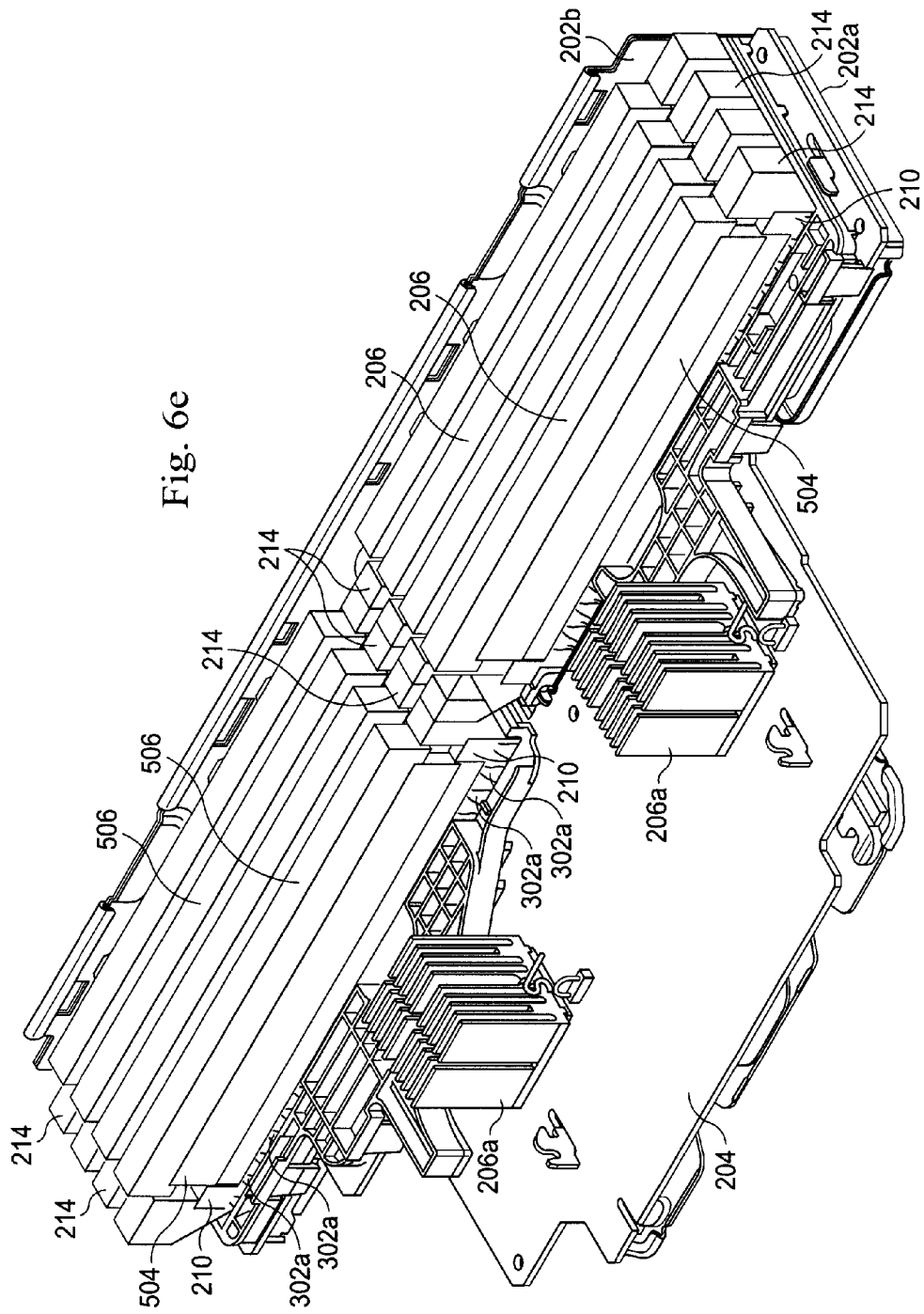

MEMORY RETENTION SYSTEM TO REDUCE SHOCK-RELATED DISCONTINUITIES

BACKGROUND

The present disclosure relates generally to information handling systems, and more particularly to a memory retention system in an information handling system for reducing shock-related memory module/memory connector discontinuities As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Many IHSs include one or more memory modules that are each coupled to a memory connector in the IHS. The memory connector is typically mounted to a board and coupled to a processor through the board. Conventional or industry standard memory connectors are typically designed for memory modules that operate on the order of microseconds and have a weight of approximately 35 grams. However, as IHS speeds have increased, memory module operational speeds have increased to the order of nanoseconds, and memory module weights have increased to over 55 grams. The support and retention of these faster, heavier memory modules with conventional memory connectors raises a number of issues.

Conventional or industry standard memory connectors may used to support and retain memory modules that are heavier and that operate at faster speeds than the memory connectors are designed for. However, shock events may induce a movement of the memory module that can become decoupled from the movement of the memory connector, which allows the memory module to "rock" in the memory connector and cause the normal forces that electrically couple the memory module and the memory connector to fluctuate. The fluctuation of these normal forces may cause discontinuities between the memory modules contacts and the memory connector contacts that are on the order of microseconds, which can result in system errors for memory modules that operate on the order of nanoseconds.

Accordingly, it would be desirable to provide an improved system for reducing shock-related memory module/memory connector discontinuities.

SUMMARY

According to one embodiment, a component retention and support system includes a component chassis; a board mounted to the component chassis; a component connector that is mounted to the board and that includes a pair of guide members at opposite distal ends of the component connector and a pair of opposing outer walls extending between the guide members; a connector reinforcing member that engages the component connector to urge the guide members toward each other and to urge the opposing outer walls toward each other; and a damping member that is operable to be positioned adjacent to and spaced apart from the component connector in order to engage a component when the component is coupled to the component connector.

BRIEF DESCRIPTION OF THE DRAWINGS

FIG. 2b is a perspective view illustrating an embodiment of a memory connector that is used in the memory module carrier of FIG. 2a.

FIG. 2c is a cross-sectional view illustrating an embodiment of the memory connector of FIG. 2b.

FIG. 3a is a perspective view illustrating an embodiment of a connector reinforcing member used with the memory module carrier and the memory connector of FIGS. 2a, 2b, and 2c.

FIG. 3b is a cross-sectional view illustrating an embodiment of the connector reinforcing member of FIG. 3a.

FIG. 4a is a perspective view illustrating an embodiment of a door member used with the memory module carrier of FIG. 2a.

FIG. 4b is a perspective view illustrating an embodiment of a damping pad located on the door member of FIG. 4a.

FIG. 6e is a perspective view illustrating an embodiment of a plurality of the memory modules of FIGS. 3a and 3b coupled the memory connectors in the memory module carrier of FIGS. 2a, 2b, and 2c.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
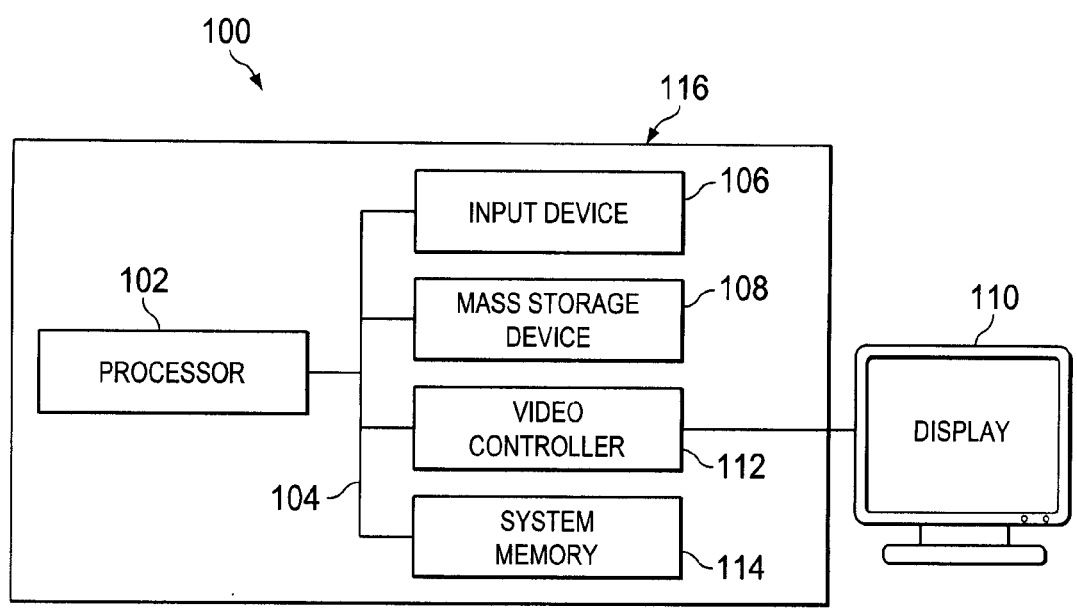
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
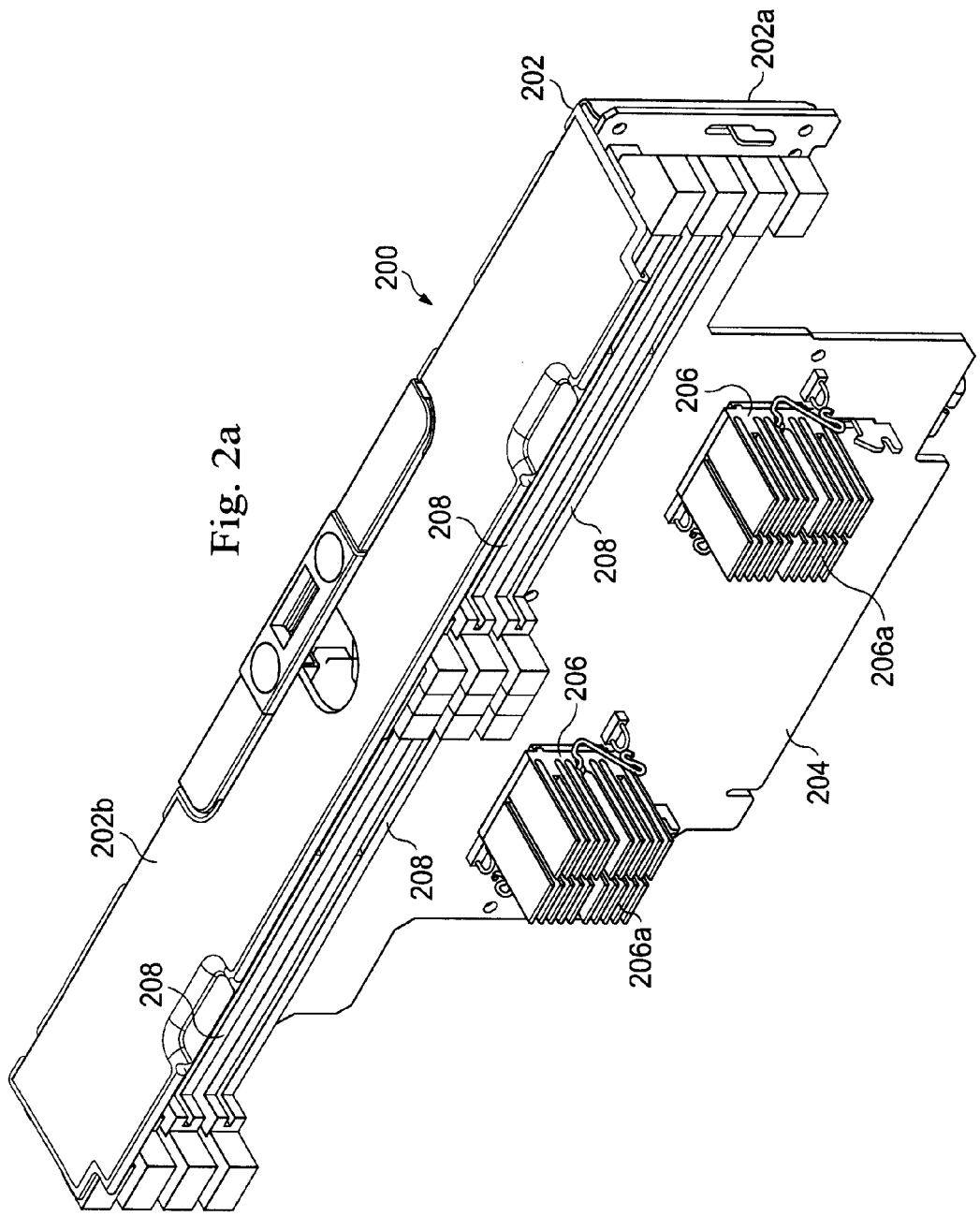
FIG. 2a is a perspective view illustrating an embodiment of a memory module carrier.

Referring now to FIGS. 2a, 2b, and 2c, an embodiment of a memory module carrier 200 is illustrated. In an embodiment, the memory module carrier 200 may be the IHS 100, described above with reference to FIG. 1, and may include some or all of the components of the IHS 100. While the illustrated embodiment of the memory module carrier 200 described below is directed to memory modules, one of skill in the art will recognize that the carrier may be a component carrier that may carry a variety of components such as, for example, IHS cards and/or other circuit boards, in place of the memory modules without departing from the scope of the present disclosure. The memory module carrier 200 includes a memory chassis 202 having a side wall 202a and a top wall 202b that extends substantially perpendicularly to the side wall 202a. A board 204 is mounted to the memory chassis 202 any may includes a variety of components known in the art such as the processors 206 and heat sinks 206a in the illustrated embodiment. A plurality of memory connectors 208 are mounted to the board 204. An embodiment of a memory connector 208 that may be mounted to the board 204 is illustrated in FIGS. 2b and 2c in more detail. The memory connector 208 includes an elongated base 208a having a top surface 208b, a bottom surface 208c that is located opposite the top surface 208a and engages the board 204, and a pair of opposing outer walls 208d and 208e that extend between the top surface 208b and the bottom surface 208c. A pair of guide members 210 are located at opposite distal ends of the elongated base 208a of the memory connector 208 such that the opposing outer walls 208d and 208e extend between the guide members 210. A coupling slot 211 is defined along the length of the elongated base 208a and along a portion of each of the guide members 211. A plurality of connector contacts 212 are housed by the memory connector 208, located adjacent the component slot 211, and extend into the board 204, as illustrated in FIG. 2c. In an embodiment, the connector contacts 212 may couple the memory connector 208 to the processor 206. A memory module coupler 214 is located adjacent each guide member 210 and may include coupling features known in the art but not shown in the illustrated embodiment for clarity of discussion. In an embodiment, the memory connectors 208 may be industry standard Dual Inline Memory Module (DIMM) connectors known in the art.

Figure 3B:
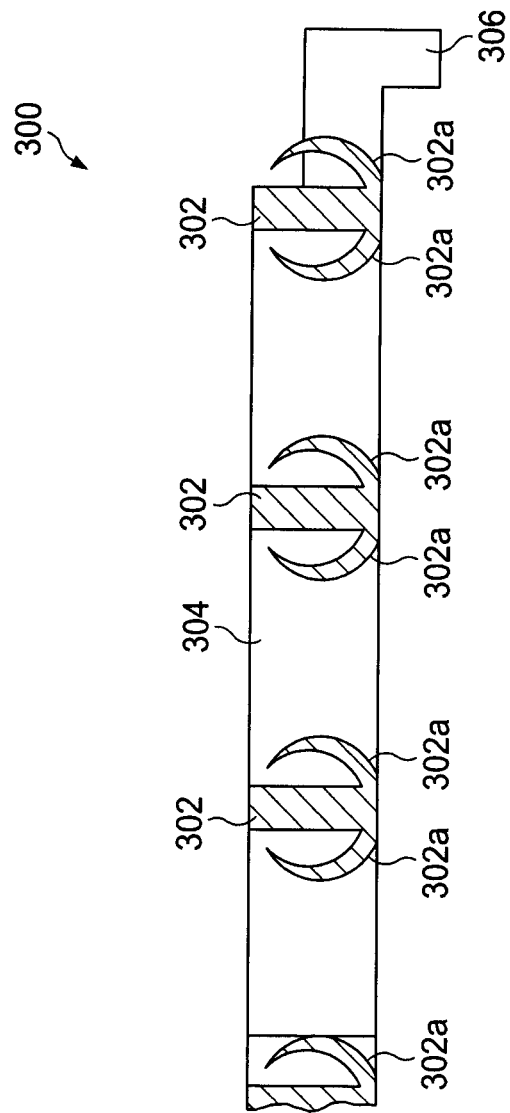

Referring now to FIGS. 3a and 3b, an embodiment of a connector reinforcing member 300 is illustrated. The connector reinforcing member 300 includes a plurality of outer wall reinforcing beams 302 that are held in a substantially parallel and spaced apart orientation from each other by a pair of guide member reinforcing beams 304. Each of the outer wall reinforcing beams 302 includes a plurality of spring members 302a extending from opposing sides of the outer wall reinforcing member 302 along its length. A plurality of board mounting features 306 may extend from the outer wall reinforcing beams 302 and/or the guide member reinforcing beams 304.

Figure 4A:
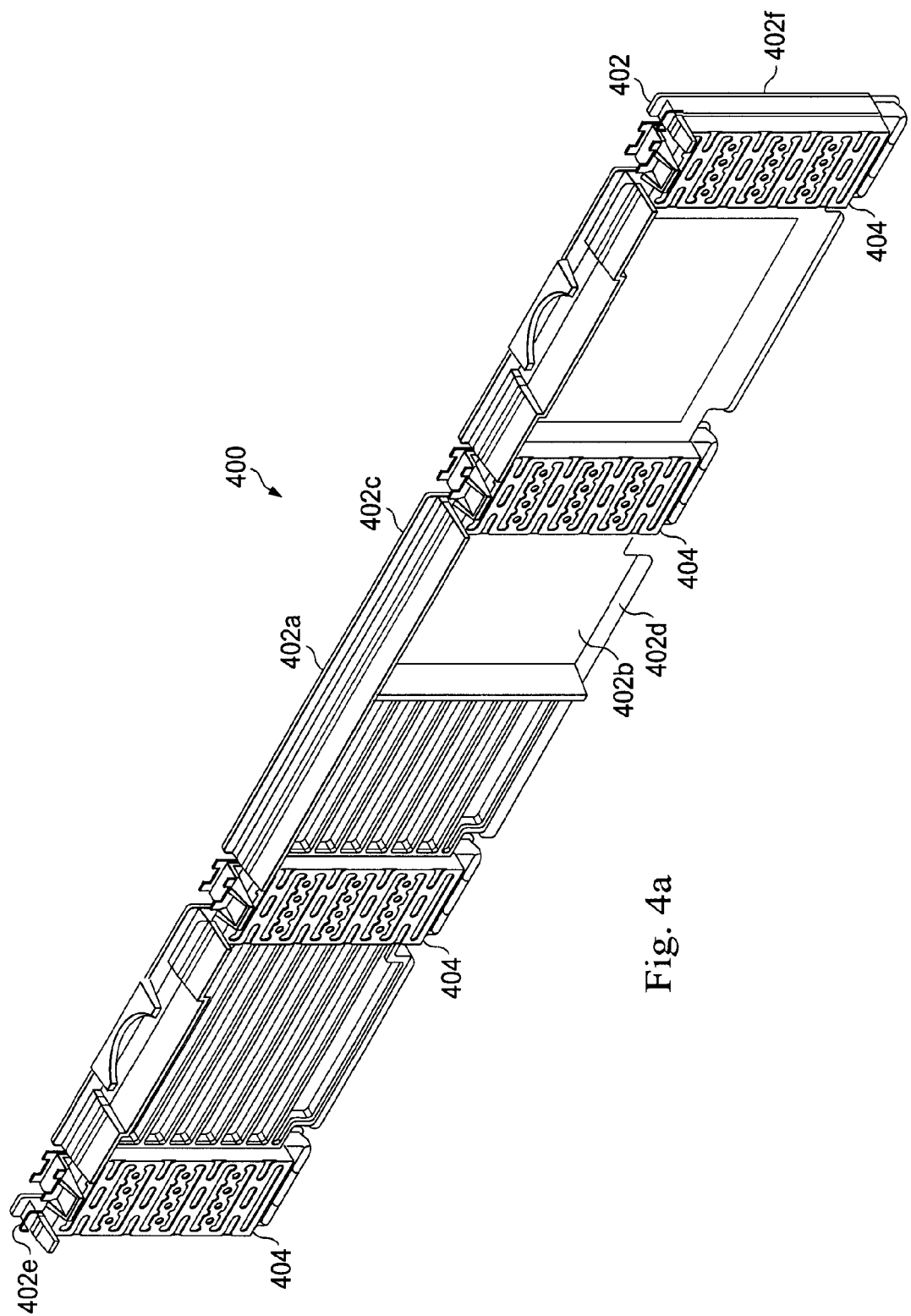
Figure 4B:
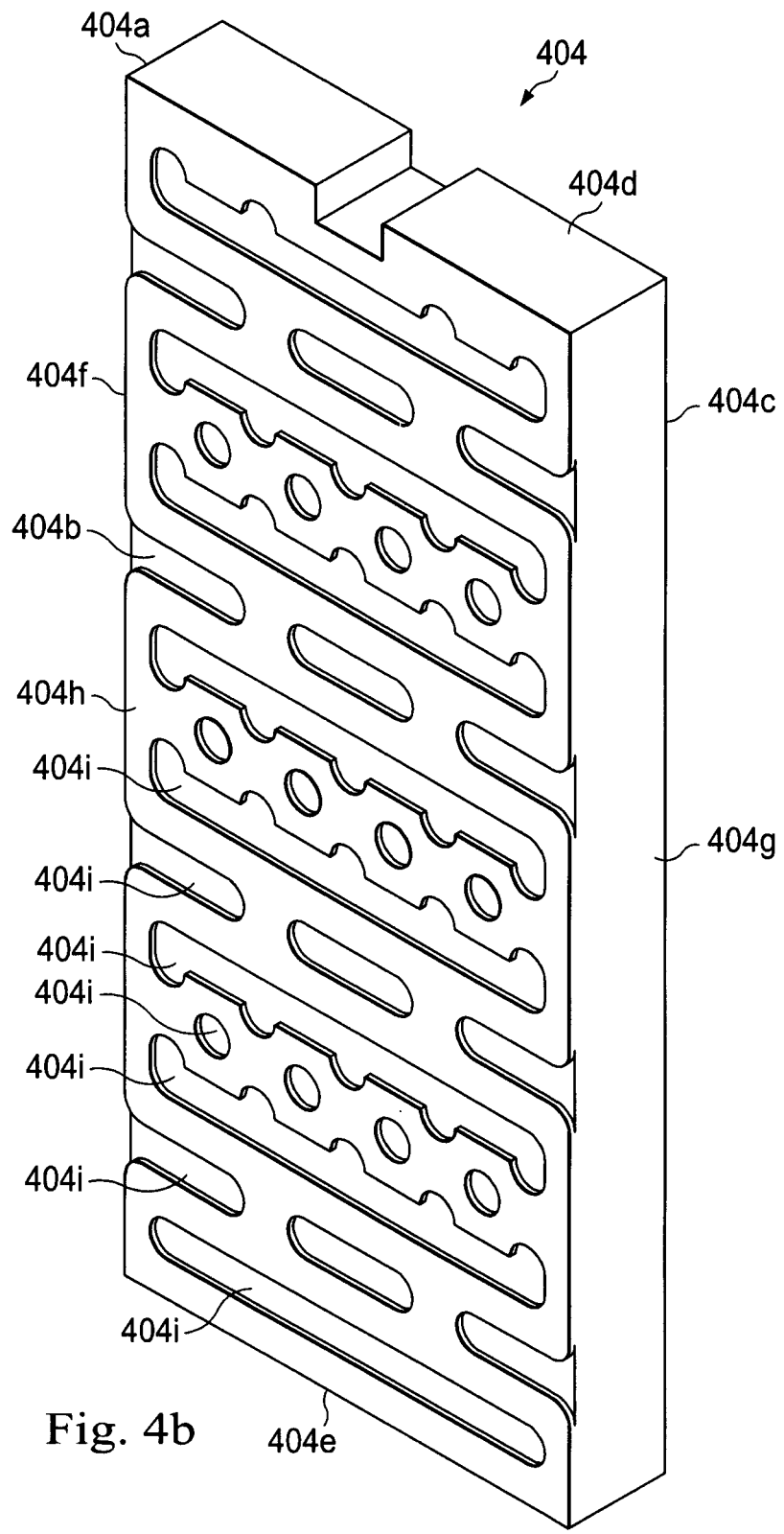

Referring now to FIGS. 4a and 4b, an embodiment of a door member 400 is illustrated. The door member 400 includes a base 402 having a top surface 402a, a bottom surface 402b located opposite the base 402 from the top surface 402a, a front edge 402c extending between the top surface 402a and the bottom surface 402b, a rear edge 402d located opposite the base 402 from the front edge 402c and extending between the top surface 402a and the bottom surface 402b, and a pair of opposing side edges 402e and 402f that extends between the top surface 402a, the bottom surface 402b, the front edge 402c, and the rear edge 402d. A damping member is provided in the illustrated embodiment as a plurality of damping pads 404 that extend from the bottom surface 402b of the door member 400 in a spaced apart orientation from each other. An embodiment of a damping pad 404 is illustrated in FIG. 4b. The damping pad 404 includes a base 404a having a front surface 404b, a rear surface 404c located opposite the base 404a form the front surface 404b, a top surface 404d extending between the front surface 404b and the rear surface 404c, a bottom surface 404e located opposite the base 404a from the top surface 404c and extending between the front surface 404b and the rear surface 404c, and a pair of opposing side surfaces 404f and 404g extending between the front surface 404b, the rear surface 404c, the top surface 404d, and the bottom surface 404e. In an embodiment, the base of the damping pad 404 is fabricated from a resilient material such as, for example, foam, rubber, and/or a variety of other damping materials known in the art. In the embodiment illustrated in FIG. 4a, the rear surface 404c of the damping pad 404 is coupled to the bottom surface 402b of the door member 400 using methods known in the art. A skin 404h is located on at least the front surface 404b of the base 404a of the damping pad 404, and defines a plurality of channels and/or apertures 404i that extend into the skin 404h and may extend through the skin 404h to the front surface 404b. In an embodiment, the skin 404h may be fabricated from a polycarbonate resin thermoplastic material such as, for example, Lexan® available from Saudi Basic Industries Corp (SABIC), and/or other materials that may provide a thermal barrier and vibration protection for a softer material from which the base 404a of the damping pad 404 is fabricated.

Figure 5:
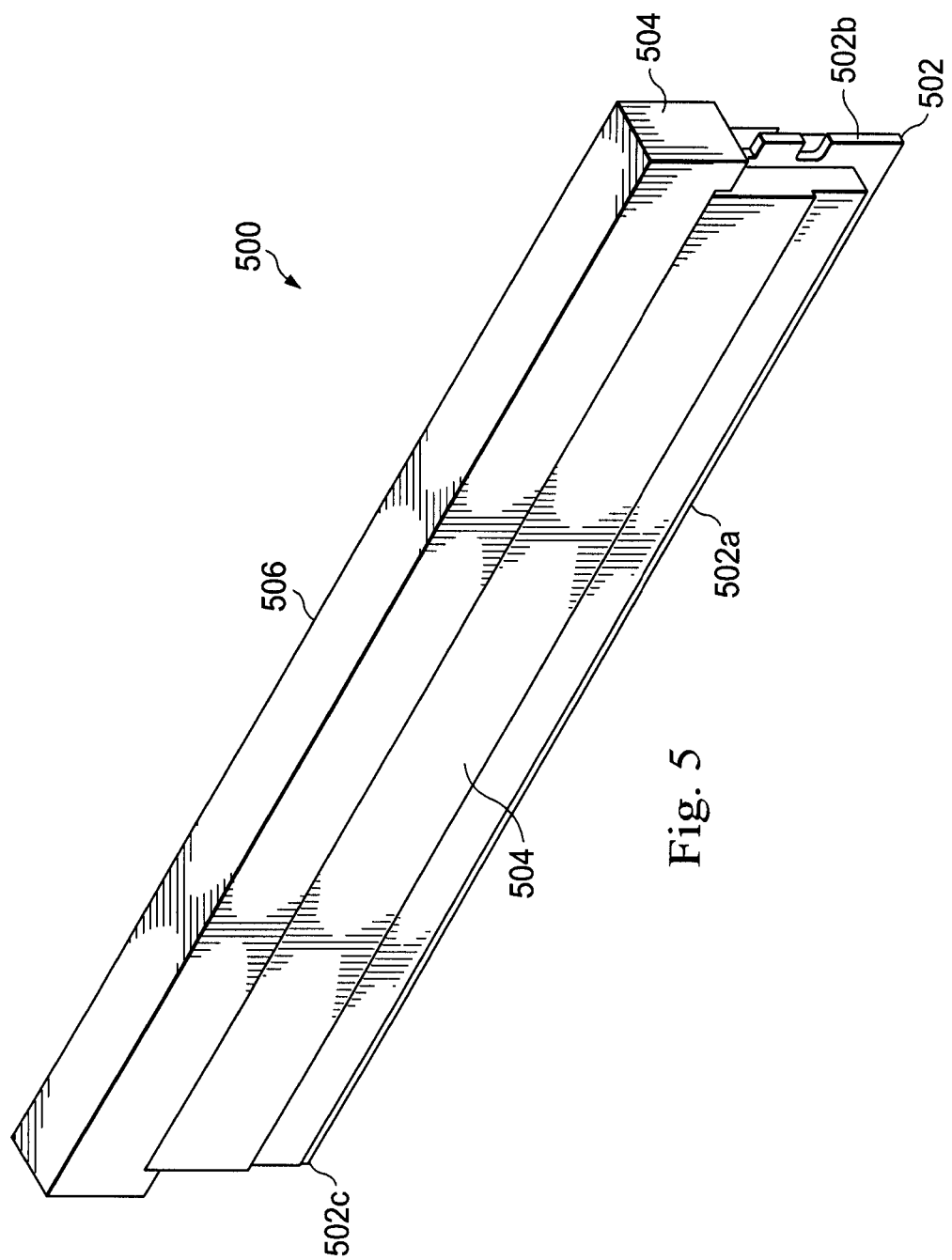
FIG. 5 is a perspective view illustrating an embodiment of a memory module used with the memory module carrier and memory connector of FIGS. 2a, 2b, and 2c.

Referring now to FIG. 5, an embodiment of a memory module 500 is illustrated. The memory module 500 includes a base 502 having a coupling edge 502a and a plurality of opposing side edges 502b and 502c that extends substantially perpendicularly from the coupling edge 502a. The coupling edge 502a includes a plurality of memory module contacts for electrically coupling components on the memory module with a memory connector, as described in further detail below. A plurality of components known in the art may be coupled to the base 502 of the memory module 500 such as, for example, a plurality of heat spreader components 504 and 506 shown in the illustrated embodiment. In an embodiment, the memory module may be a Dual DIMM known in the art. In an embodiment, the DIMMs provided for the method discussed below may include a variety of dimensions (e.g., the DIMMs provided may vary in width) and weights.

Figure 6A:
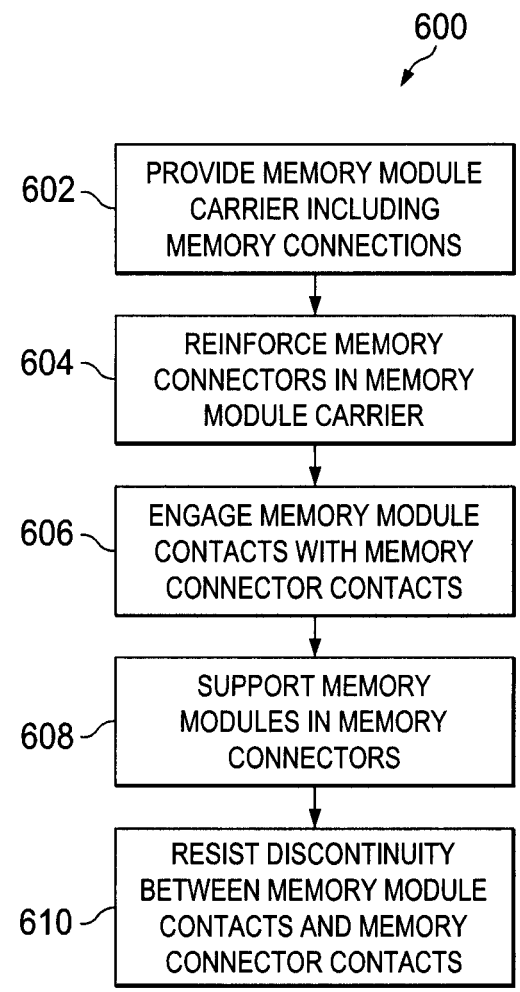
FIG. 6a is a flow chart illustrating an embodiment of a method for reinforcing and supporting a memory module.
Figure 6B:
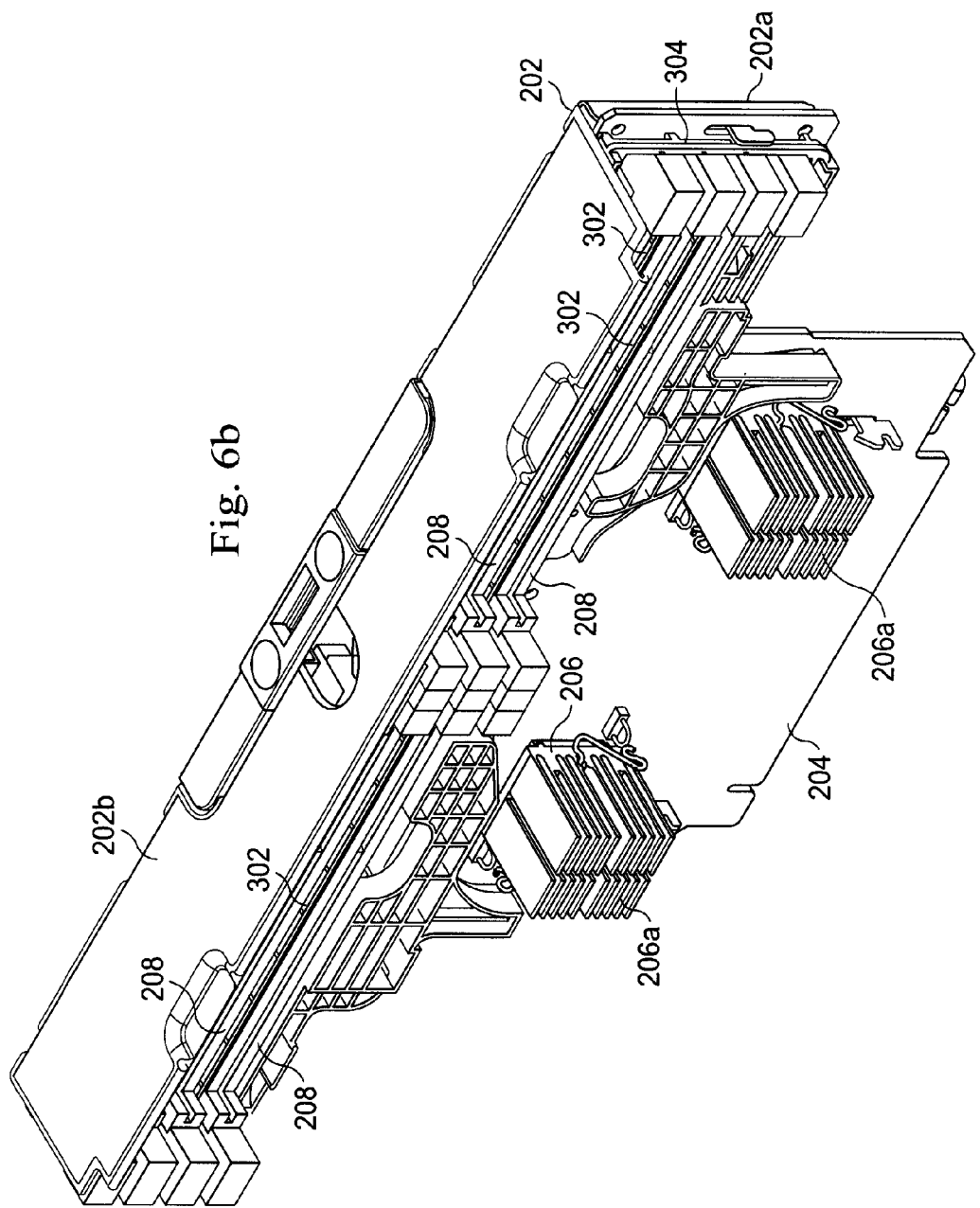
FIG. 6b is a perspective view illustrating an embodiment of the connector reinforcing member of FIGS. 3a and 3b coupled to the memory module carrier and memory connectors of FIGS. 2a, 2b, and 2c.
Figure 6C:
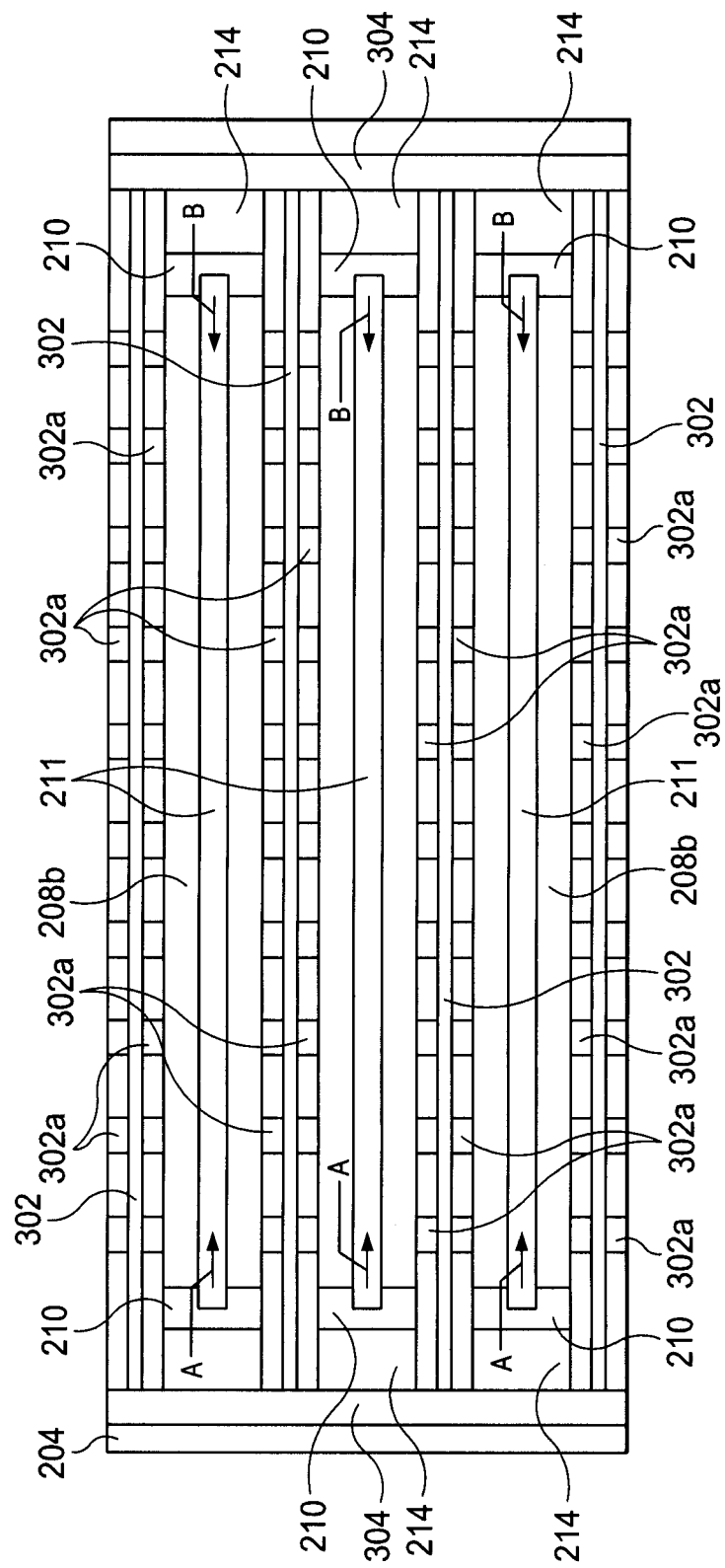
FIG. 6c is a top view illustrating an embodiment of the connector reinforcing member of FIGS. 3a and 3b engaging the memory connectors of FIGS. 2a, 2b, and 2c.
Figure 6D:
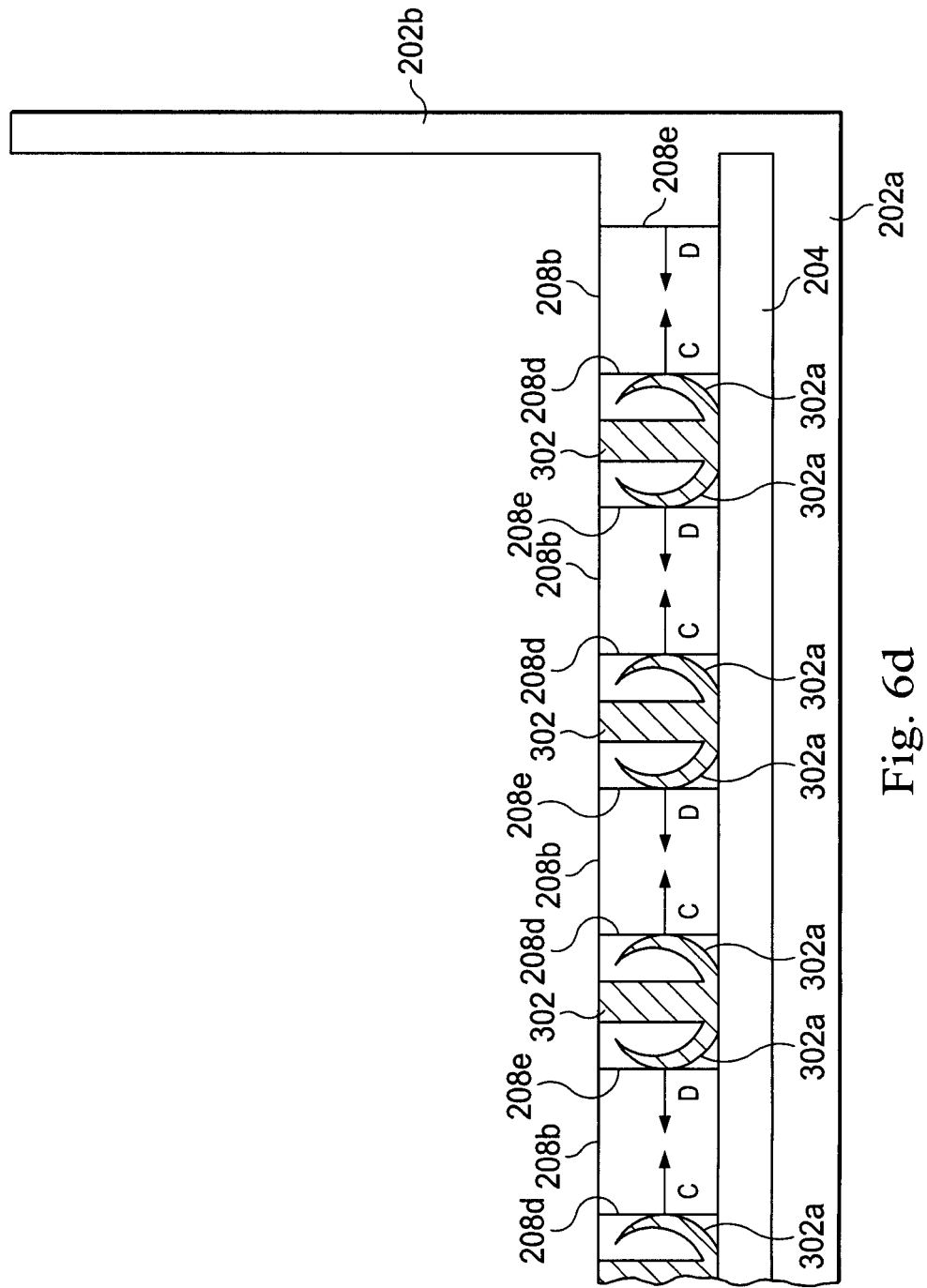
FIG. 6d is a cross-sectional view illustrating an embodiment of the connector reinforcing member of FIGS. 3a and 3b engaging the memory connectors of FIGS. 2a, 2b, and 2c.
Figure 6F:
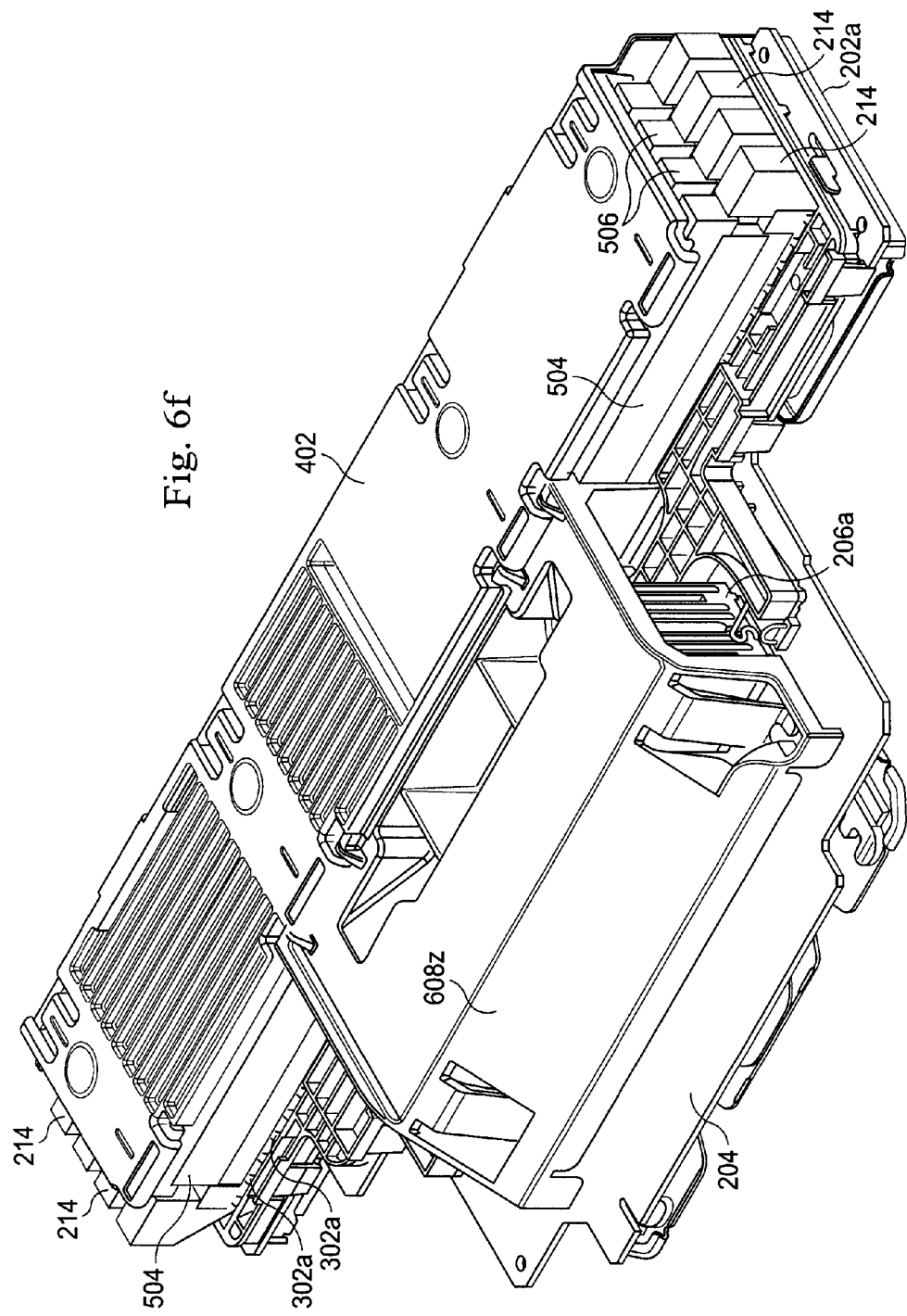
FIG. 6f is a perspective view illustrating an embodiment of the door member of FIGS. 4a and 4b coupled to the memory module carrier of FIG. 6e.

Referring now to FIGS. 6a, 6b, 6c, and 6d, a method 600 for retaining and supporting a memory module is illustrated. The method 600 begins at block 602 where a memory module carrier including memory connectors is provided. In an embodiment, the memory module carrier 200 including the memory connectors 208, described above with reference to FIGS. 2a, 2b, and 2c, is provided. The method 600 then proceeds to block 604 where the memory connectors in the memory module carrier are reinforced. The connector reinforcing member 300, described above with reference to FIGS. 3a and 3b, is mounted to the board 204 in the memory module carrier 200 such that the guide member reinforcing beams 304 engage each pair of guide members 210 on the memory connectors 208, as illustrated in FIG. 6c, and such that there is a outer wall reinforcing beam 302 positioned adjacent the opposing outer walls 208d and 208e of each memory connector 208 (except, in the illustrated embodiment, for a memory connector 208 that is positioned immediately adjacent an extension 602a of the top wall 202b, as illustrated in FIG. 6d.) With the guide member reinforcing beams 304 engaging each pair of guide members 210 on the memory connectors 208, a force is applied on a first guide member 210 on each memory connector 208 that is in a direction A while a force is applied on a second guide member 210 on each memory connector 208 that is in a direction B, as illustrated in FIG. 6c, and thus engagement of the guide member reinforcing beams 304 with each pair of guide members 210 on the memory connectors 208 urges each pair of guide members 210 on each memory connector 208 toward each other. Furthermore, the positioning of a outer wall reinforcing beam 302 adjacent the opposing outer walls 208d and 208e of each memory connector 208 results in the spring members 302a on each outer wall reinforcing beam 302 engaging the opposing outer walls 208d and 208e of each memory connector 208. With the spring members 302a on each outer wall reinforcing beam 302 engaging the opposing outer walls 208d and 208e of each memory connector 208, a force is applied on the outer wall 208d on each memory connector 208 that is in a direction C while a force is applied on the outer wall 208e on each memory connector 208 that is in a direction D, as illustrated in FIG. 6d, and thus engagement of the springs members 302a with of the opposing outer walls 208d and 208e on the memory connectors 208 urges the opposing outer walls 208d and 208e on each memory connector 208 toward each other. As can be seen in FIG. 2C, the outer walls 208d and 208e provide the base strength for the connector contacts 212, and the engagement of the springs members 302a with of the opposing outer walls 208d and 208e increase this base strength.

Referring now to FIGS. 6a and 6e, the method 600 then proceeds to block 606 where contacts on a memory module are engaged with contacts on the memory connectors. A memory module 500, described above with reference to FIG. 5, may be coupled to each memory connector 208 in the memory module carrier 200 by positioning the coupling edge 502a on the memory module 500 in the coupling slot 211 defined by the memory connector 208, as illustrated in FIG. 6e. With the memory module 500 coupled to the memory connector 208, the plurality of memory module contacts on the coupling edge 502a engage the plurality of connector contacts 212 in the coupling slot 211.

Figure 6G:
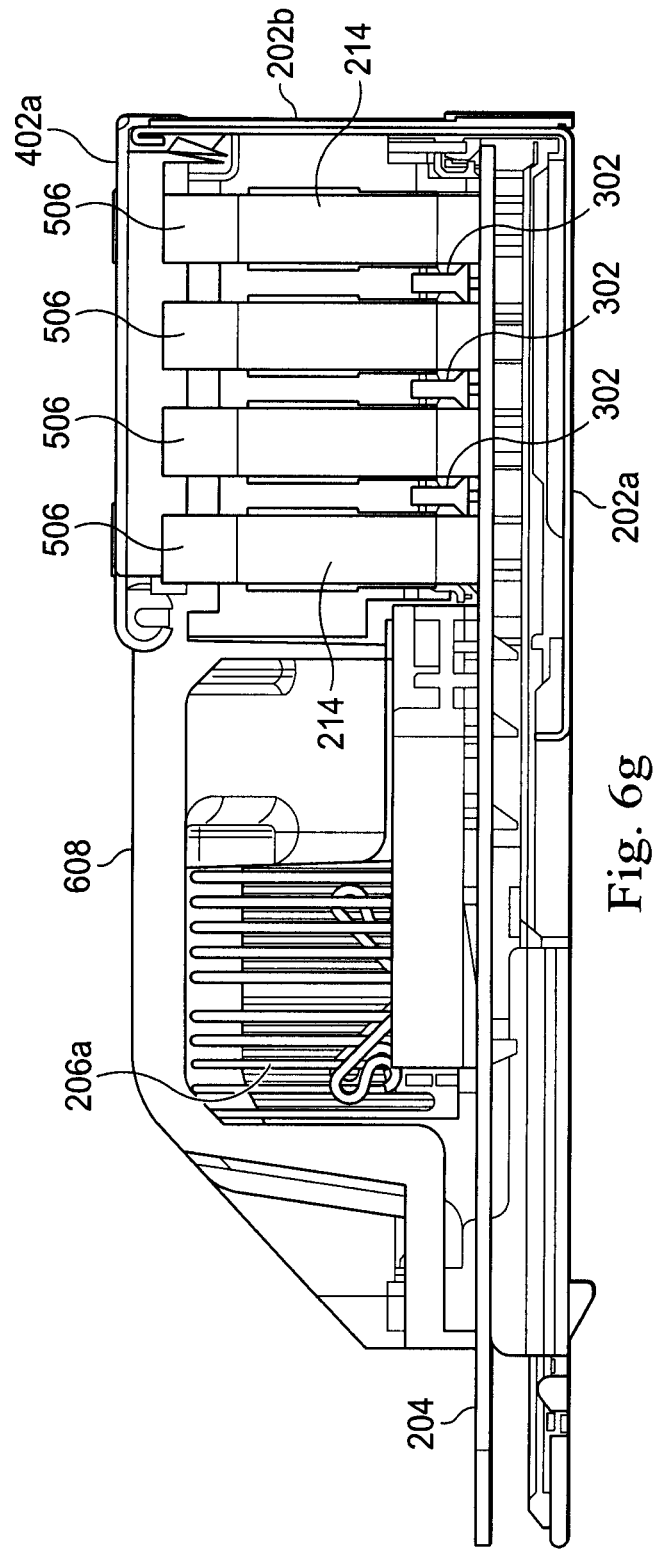
FIG. 6g is a side view illustrating an embodiment of the door member of FIGS. 4a and 4b coupled to the memory module carrier of FIG. 6e.
Figure 6H:
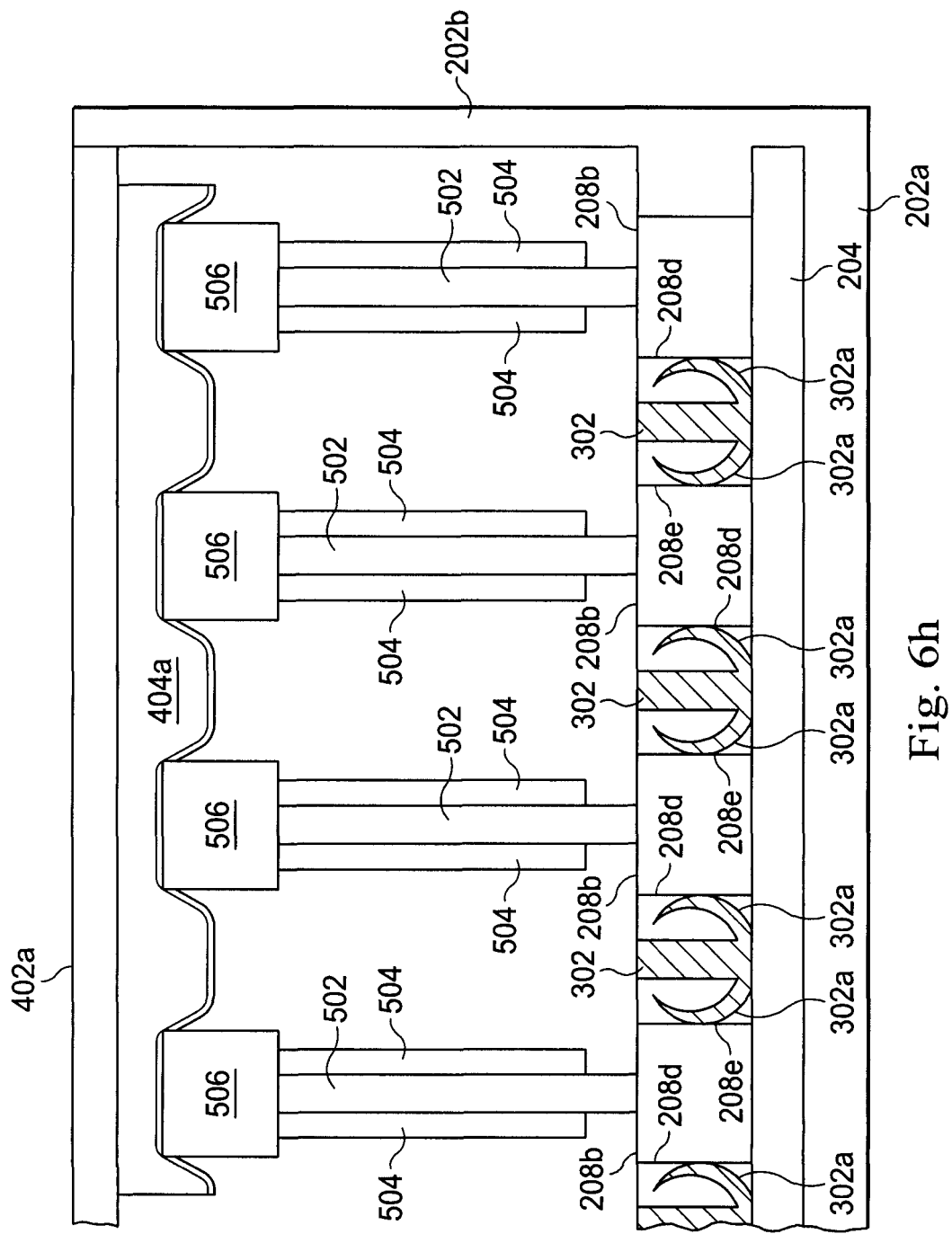
FIG. 6h is a cross-sectional view illustrating an embodiment of the door member of FIGS. 4a and 4b coupled to the memory module carrier of FIG. 6e.
Figure 6I:
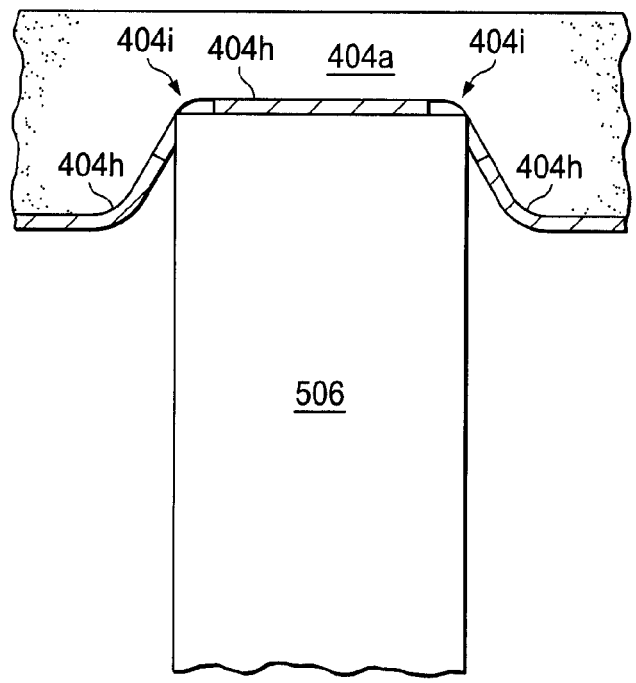
FIG. 6i is a side view illustrating an embodiment of the memory module of FIG. 5 engaging channels in the damping pad of FIG. 4b.
Figure 6J:
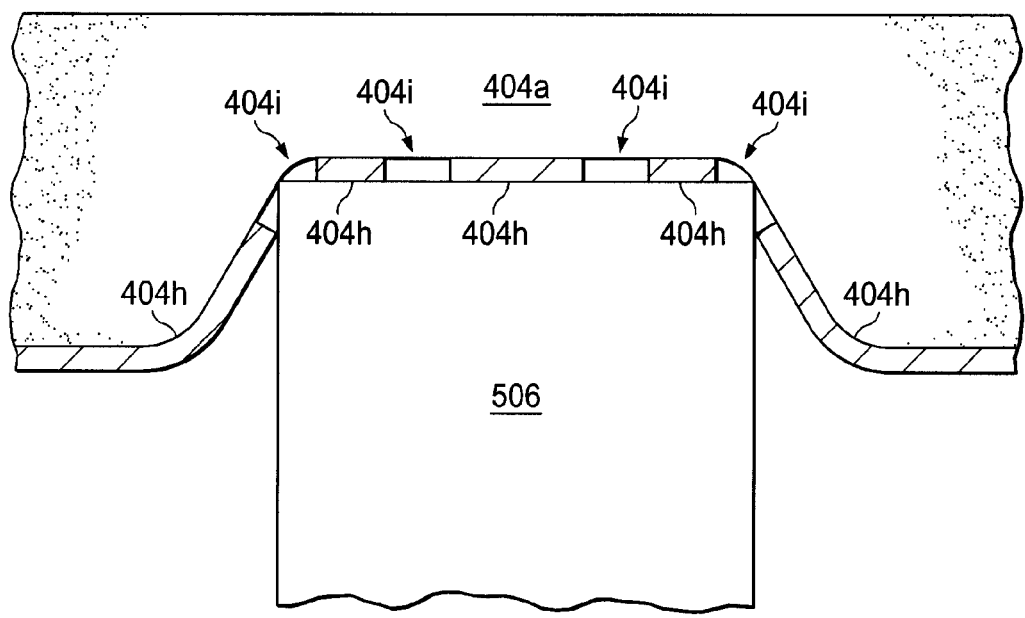
FIG. 6j is a side view illustrating an embodiment of a memory module engaging channels in the damping pad of FIG. 4b.

Referring now to FIGS. 6a, 6f, 6g, 6h, 6i, and 6j, the method 600 then proceeds to block 608 where the memory modules are supported in the memory connectors. In an embodiment, the door member 400 may be pivotally coupled to the side wall 202a on the memory module carrier 200, and at block 608, the door member 400 may be pivoted about this coupling such that the damping pads 404 on the bottom surface 402b of the door member 400 engage the heat spreader component 506 on each of the memory modules 500 at a location on the memory module 500 that is opposite the memory module 500 from the memory connector 208, as illustrated in FIG. 6h. Engaging the memory module 500 opposite the memory module 500 from the memory connector 208 provides damping without obstructing airflow past the heat spreader components 504. As can be seen, the spaced-apart damping pads 404 on the door member 400 engage each memory module 500 at locations on the heat spreader component 506 that are adjacent the guide members 210. FIGS. 6i and 6j illustrate a more detailed view of the engagement of the memory module 500 and the damping pad 404. In FIG. 6i, a first-sized memory module 500 (e.g., a memory module having a heat spreader component 506 of a first width) engages the damping pad 404, and it can be seen that the edges of the heat spreader component 506 on the memory module 500 engage the channels 404i defined by the skin 404 such that the edges of the heat spreader component 506 become located in the channels 404i and may engage the top surface 404b of the base 404a of the damping pad 404 to allow the base 404a material to deform around thee edges of the heat spreader component 506. Locating the edges of the heat spreader component 506 on the memory module 500 in the channels 404i defined by the skin 404 allows the damping pad 404 to 'grab' the memory module 500 to prevent a relative sliding between the memory module 500 and the damping pad 404. Furthermore, FIG. 6j illustrates a second-sized memory module, which is a larger-sized memory module than the first-sized memory module 500 discussed above (e.g., it is a memory module having a heat spreader component 506 that is wider than the heat spreader component on the first sized memory module discussed above), engaging the damping pad 404 such that the edges of the heat spreader component 506 on the second-sized memory module engage the channels 404i defined by the skin 404 such that the edges of the heat spreader component 506 become located in the channels 404i and may engage the top surface 404b of the damping pad 404 so that the base 404a material of the damping pad 404 may deform around the edges of the heat spreader component 506 and 'grab' the second-sized memory module. Thus, the plurality of channels 404i defined by the skin 404h on the damping pads 404 are oriented such that a plurality of different sized memory modules may engage the channels 404i. In an embodiment, a shroud 608a may be coupled to the door member 400 and the board 204 and adjacent the heat sinks 206a, as illustrated in FIG. 6g.

Figure 6K:
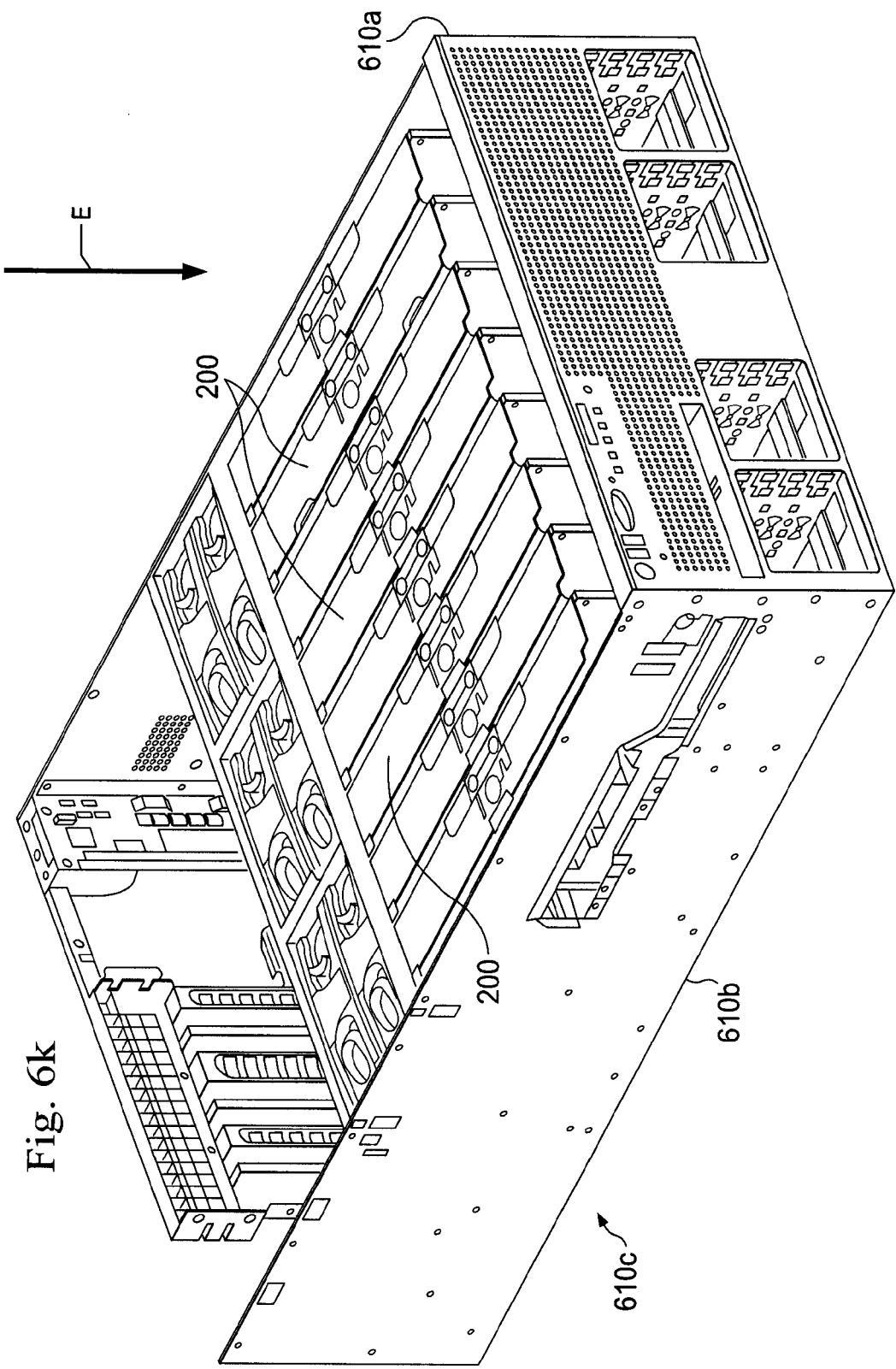
FIG. 6k is a side view illustrating an embodiment of the memory module carrier with door member of FIG. 6f coupled to an information handling system.

Referring now to FIGS. 6a and 6k, the method 600 then proceeds to block 610 where a discontinuity between contacts on the memory modules and contacts on the memory connectors are resisted. An embodiment of the memory carrier is described in co-pending U.S. patent application Ser. No. 12/846,286, filed on Jul. 29, 2010 (e.g., the memory device(s) 610a discussed and illustrated with reference to FIGS. 6g and 6h), and U.S. patent application Ser. No. 12/953,035, filed on Nov. 23, 2010, the disclosures of which are incorporated herein by reference. An IHS chassis 610a may be provided that may be the IHS chassis 116, discussed above with reference to FIG. 1, and may include some or all of the components of the IHS 100. The IHS chassis 610a may include a support engagement surface 610b that engages a support surface 610c to support the IHS chassis 610a. One or more of the memory module carriers 200 that have had their memory connectors 208 reinforced and memory modules 500 supported by damping pads, as discussed above, may be removeably coupled to the IHS chassis 610a such that the memory modules 500 coupled to the memory module carriers 200 become coupled to a processor (e.g., the processor 102, described above with reference to FIG. 1) that is housed in the IHS chassis 610a.

The IHS chassis 610a and/or the memory module carrier 200 may experience a shock event. However, due to the reinforcing of the memory connectors 208 with the connector reinforcing member 300 and the supporting of the memory modules 500 with the damping pads 404, discussed above, discontinuities between the memory module contacts and the connectors contacts 212 are resisted such that the memory modules 500 and memory connectors 208 maintain connectivity and do not cause errors during the shock event. The engagement of the guide member reinforcing beams 304 with each pair of guide members 210 on the memory connectors 208 that urges each pair of guide members 210 on each memory connector 208 toward each other provides a tighter coupling between the memory modules 500 and memory connectors 208 than is provided without the connector reinforcing member 300. This results in memory module 500 movement being more immediately resisted by the memory connector 208 during shock events, and any resultant movement of the memory module 500 is more tightly coupled to the movement of the memory connector 208. The engagement of the springs members 302a on the side wall reinforcing beams 302 with of the opposing outer walls 208d and 208e on the memory connectors 208 that urges the opposing outer walls 208d and 208e on each memory connector 208 toward each other strengthens the outer walls 208d and 208e of the memory connectors 208 and the contact normal forces along the length of the memory module 500 by preventing the outer walls 208d and 208e from bending or flexing as the connector contacts 212 get stressed by the moving memory module 500, and thus resists the contact normal forces from varying or degrading during shock events. The engagement of the damping pads 404 with the memory modules 500 reduces the amount of time that a shock event lasts and the severity of the energy released during the shock event for the memory module 500/memory connector 208 combination. As can be seen in the illustrated embodiment, with the memory module carriers 200 coupled to the IHS 610a and the support engagement surface 610b on the IHS 610a engaging the support surface 610c, the memory modules 400 may extend from the memory connectors 208 in an orientation that is perpendicular to a force E from gravity (i.e., the memory module 500 extends from the memory connector 208 substantially perpendicularly to the board 204) such that the force E from gravity provides a moment on the memory module 500 that acts at the engagement of the memory module contacts and the connectors contacts 212. The system and method discussed above provide benefits in such a system as shock events that act on the memory module 500/memory connector 208 combination in such systems are typically magnified by the force of gravity.

Thus, a system and method have been described that allow conventional memory connectors to be reinforced such that they may couple memory modules, which are heavier than the memory connectors are designed for, to other components. Those memory modules may be further supported opposite the memory connectors such that discontinuities between contacts on the memory module and contacts on the memory connector are resisted during shock events. In an embodiment, the system and method provide a retrofit for standard/conventional memory connectors to allow those memory connectors to retain and support the latest technology memory modules.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A component retention and support system, comprising:
   a component chassis;
   a board mounted to the component chassis;
   a first component connector that is mounted to the board and includes a pair of first guide members at opposite distal ends of the first component connector, a pair of opposing first outer walls extending between the first guide members, and a set of first connector contacts located between the opposing first outer walls;
   a second component connector that is mounted to the board adjacent the first component connector, wherein the second component connector includes a pair of second guide members at opposite distal ends of the second component connector, a pair of opposing second outer walls extending between the second guide members, and a set of second connector contacts located between the opposing second outer walls;
   a connector reinforcing member that engages the first component connector to urge the first guide members toward each other, engages the second component connector to urge the second guide members toward each other, and that includes a plurality of outer wall reinforcing beams located on each side of the first component connector and that engage the opposing first outer walls to urge the set of first connector contacts toward each other, wherein one of the plurality of outer wall reinforcing beams engages a first of the opposing second outer walls on the second component connector to urge a first of the set of second connector contacts towards a second of the set of second connector contacts; and a damping member that is operable to be positioned adjacent to and spaced apart from the first component connector and the second component connector in order to engage a first component when the first component is coupled to the first component connector and to engage a second component when the second component is coupled to the second component connector.

2. The system of claim 1, wherein a discontinuity between a plurality of component contacts on the component and the set of first connector contacts is resisted due to the engagement of the connector reinforcing member with the first component connector and the engagement of the damping member with the first component.

3. The system of claim 1, wherein each of the plurality of outer wall reinforcing beams located on either side of the first component connector includes a plurality of spring members that engage the opposing first outer walls to urge the set of first connector contacts towards each other, and the one of the plurality of outer wall reinforcing beams that engages the first of the opposing second outer walls on the second component connector includes a plurality of spring members that engage the first of the opposing second outer walls to urge the first of the set of second connector contacts towards the second of the set of second connector contacts.

4. The system of claim 1,
wherein the connector reinforcing member includes an outer wall reinforcing beam that engages a second of the opposing second outer walls on the second component connector to urge the second of the set of second connector contacts towards the first of the set of second connector contacts.

5. The system of claim 1, wherein the damping member is fabricated from damping material that includes a skin, and wherein the skin defines a plurality of channels and at least one of the plurality of channels is operable to engage an edge of the component when the component is coupled to the component connector.

6. The system of claim 5, wherein the plurality of channels are oriented such that they are operable to engage a plurality of different sized components.

7. The system of claim 1, further comprising:
a door member coupled to the component chassis, wherein the damping member extends from the door member.

8. The system of claim 1, wherein the damping member includes a plurality of spaced apart damping pads that are operable to engage the component at locations that are adjacent the pair of guide members.

9. An information handling system (IHS), comprising:
an IHS chassis that houses a processor;
a memory chassis that is removeably coupled to the IHS chassis;
a board that is mounted to the memory chassis;
a first memory module connector that is mounted to the board, defines a first coupling slot, includes a pair of first guide members at opposite distal ends of the first memory module connector and a pair of opposing first outer walls extending between the first guide members, and includes a set of first connector contacts located between the opposing first outer walls and in the first coupling slot, wherein the first memory module connector is removeably coupled to the processor;
a second memory module connector that is mounted to the board adjacent the first memory module connect, wherein the second memory module connector defines a second coupling slot, includes a pair of second guide members at opposite distal ends of the second memory module connector and a pair of opposing second outer walls extending between the second guide members, and includes a set of second connector contacts located between the opposing second outer walls and in the second connector slot, wherein the second memory module connector is removeably coupled to the processor;
a first memory module having a first edge that is located in the first coupling slot and coupled to the processor through the first memory module connector;
a second memory module having a second edge that is located in the second coupling slot and coupled to the processor through the second memory module connector;
a connector reinforcing member that engages the first memory module connector to urge the first guide members toward each other, engages the second memory module connector to urge the second guide members toward each other, and that includes a plurality of outer wall reinforcing beams located on each side of the first memory module connector and that engage the opposing first outer walls to urge the set of first connector contacts toward each other, wherein one of the plurality of outer wall reinforcing beams engages a first of the opposing second outer walls on the second component connector to urge a first of the set of second connector contacts towards a second of the set of second connector contacts; and
a damping member engaging the first memory module and the second memory module.

10. The system of claim 9, wherein a discontinuity between a plurality of memory module contacts on the memory module and the set of first connector contacts is resisted due to the engagement of the connector reinforcing member with the first memory module connector and the engagement of the damping member with the first memory module.

11. The system of claim 9, wherein each of the plurality of outer wall reinforcing beams located on each side of the first memory module connector includes a plurality of spring members that engage the opposing first outer walls to urge set of first connector contacts towards each other, and the one of the plurality of outer wall reinforcing beams that engages the first of the opposing second outer walls on the second memory module connector includes a plurality of spring members that engage the first of the opposing second outer walls to urge the first of the set of second connector contacts towards the second of the set of second connector contacts.

12. The system of claim 9,
wherein the connector reinforcing member includes an outer wall reinforcing beam that engages a second of the opposing second outer walls on the second memory module connector to urge the second of the set of second connector contacts towards the first of the set of second connector contacts.

13. The system of claim 9, wherein the damping member is fabricated from damping material that includes a skin, and wherein the skin defines a plurality of channels and at least one of the plurality of channels engages the second edge of the memory module.

14. The system of claim 13, wherein the plurality of channels are oriented such that they are operable to engage a plurality of different sized memory modules.

15. The system of claim 9, further comprising:
a door member coupled to the memory chassis, wherein the damping member extends from the door member.

16. The system of claim 9, wherein the damping member includes a plurality of spaced apart damping pads that engage the memory module at locations that are adjacent the pair of guide members.

17. A method for retaining and supporting a component, comprising:
   providing a component chassis having a first component connector that defines a first component slot and includes a pair of first guide members at opposite distal ends of the first component connector and a pair of opposing first outer walls extending between the first guide members, and a second component connector that located adjacent the first component connector and that defines a second component slot and includes a pair of second guide members at opposite distal ends of the second component connector and a pair of opposing second outer walls extending between the second guide members;
   positioning a first edge of a first component in the first component slot defined by the first component connector to engage a set of first component contacts with a set of first connector contacts;
   positioning a second edge of a second component in the second component slot defined by the second component connector to engage a set of second component contacts with a set of second connector contacts; and
   resisting a discontinuity between the set of first component contacts and the set of first connector contacts by:
      engaging the first component connector with a connector reinforcing member to urge the first guide members toward each other and engaging each of the opposing first outer walls with respective outer wall reinforcing members on the connector reinforcing member to urge the set of first connector contacts toward each other, wherein one of the respective outer wall reinforcing member engages a first of the opposing second outer walls to urge a first of the of the set of second connector contacts towards a second of the set of second connector contacts; and
   engaging the first component and the second component with a damping member.

18. The method of claim 17, further comprising:
   coupling the component chassis to an IHS chassis to couple the component to a processor.

19. The method of claim 17, further comprising:
   positioning the component chassis such that the component extends from the component connector in an orientation that is perpendicular to gravity.

20. The method of claim 17, wherein the engaging the first component and the second component with the damping member comprises engaging each of the first component and the second component with a pair of spaced apart damping pads that engage the first component at locations that are adjacent the pair of first guide members and engage the second component at locations that are adjacent the pair of second guide members.

* * * * *